United States Patent
Iraha et al.

(10) Patent No.: US 8,818,692 B2
(45) Date of Patent: Aug. 26, 2014

(54) CONTROL APPARATUS OF HYBRID VEHICLE

(75) Inventors: Yumi Iraha, Toyota (JP); Tomoyuki Maruyama, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 987 days.

(21) Appl. No.: 12/600,972

(22) PCT Filed: Mar. 30, 2009

(86) PCT No.: PCT/JP2009/057009
§ 371 (c)(1),
(2), (4) Date: Nov. 19, 2009

(87) PCT Pub. No.: WO2009/128355
PCT Pub. Date: Oct. 22, 2009

(65) Prior Publication Data
US 2010/0198438 A1    Aug. 5, 2010

(30) Foreign Application Priority Data
Apr. 15, 2008    (JP) ................. 2008-105815

(51) Int. Cl.
*G06F 7/00* (2006.01)
*B60K 6/20* (2007.10)
*B60W 10/06* (2006.01)
*B60K 6/365* (2007.10)
*B60W 10/26* (2006.01)
*B60W 40/00* (2006.01)
*B60K 6/445* (2007.10)
*B60K 1/02* (2006.01)
*B60W 20/00* (2006.01)

(52) U.S. Cl.
CPC ............... *B60K 6/445* (2013.01); *B60W 10/06* (2013.01); *B60W 2540/16* (2013.01); *B60W 2530/14* (2013.01); *B60K 6/365* (2013.01); *B60W 2510/244* (2013.01); *B60K 1/02* (2013.01); *Y02T 10/6239* (2013.01); *B60W 2520/10* (2013.01); *B60L 2240/486* (2013.01); *B60W 2710/0666* (2013.01); *B60W 10/26* (2013.01); *B60W 20/00* (2013.01); *B60W 40/00* (2013.01); *B60W 2540/10* (2013.01)
USPC ........... 701/104; 701/102; 701/103; 701/123; 180/65.28; 180/65.285

(58) Field of Classification Search
USPC ............................................ 701/104, 103, 22
See application file for complete search history.

(56) References Cited

U.S. PATENT DOCUMENTS 5,670,830 A * 9/1997 Koga et al. ................... 307/10.1
6,351,698 B1   2/2002 Kubota et al.
(Continued)

FOREIGN PATENT DOCUMENTS

JP    2007 62638    3/2007
JP    2007 168512   7/2007
(Continued)

OTHER PUBLICATIONS

Office Action issued Dec. 13, 2011, in Japanese Patent Application No. 2008-105815.

*Primary Examiner* — Helal A Algahaim
*Assistant Examiner* — Paul Castro
(74) *Attorney, Agent, or Firm* — Oblon, Spivak, McClelland, Maier & Neustadt, L.L.P.

(57) ABSTRACT

A hybrid vehicle 1 includes as drive sources an internal combustion engine 20, to which fuel stored in a fuel tank 21 is supplied, and a second M/G 32, to which electricity stored in a battery 40 is supplied. The vehicle 1 also includes a battery charger 70 for charging the battery 40 from the outside of the vehicle 1. For each of a plurality of refuelings to the fuel tank 21, the history of the time of refueling and the amount of refueling are stored. Based on the history, the degree of deterioration of fuel in the fuel tank 21 is calculated.

6 Claims, 8 Drawing Sheets

(56) References Cited

U.S. PATENT DOCUMENTS

| | | | |
|---|---|---|---|
| 6,557,534 B2 * | 5/2003 | Robichaux et al. | 123/520 |
| 6,793,027 B1 * | 9/2004 | Yamada et al. | 180/65.1 |
| 2007/0204838 A1 * | 9/2007 | Leone et al. | 123/518 |
| 2008/0167788 A1 * | 7/2008 | Tate et al. | 701/104 |
| 2008/0271718 A1 * | 11/2008 | Schondorf et al. | 123/520 |
| 2008/0308066 A1 * | 12/2008 | Martin et al. | 123/520 |
| 2009/0099756 A1 * | 4/2009 | Demura | 701/103 |

FOREIGN PATENT DOCUMENTS

| | | |
|---|---|---|
| JP | 2008 100645 | 5/2008 |
| JP | 2008-149972 | 7/2008 |

* cited by examiner

CONTROL APPARATUS OF HYBRID VEHICLE

FIELD OF THE INVENTION

The present invention relates to a control apparatus of a hybrid vehicle that has as drive sources an internal combustion engine, to which fuel stored in a fuel tank is supplied, and an electric motor, to which electricity stored in an electric storage device is supplied.

BACKGROUND OF THE INVENTION

In recent years, various types of hybrid vehicles having an internal combustion engine and an electric motor as drive sources have been developed. Such a hybrid vehicle uses the internal combustion engine and the electric motor in combination according to the driving state of the vehicle, thereby improving the fuel consumption rate and the emission performance, while ensuring a sufficient dynamic performance of the vehicle.

The internal combustion engine is driven by being supplied with fuel in the fuel tank, and the electric motor is driven by being supplied with electricity of the electric storage device. To maintain the state of charge of the electric storage device in a predetermined range, the electric storage device is charged by electricity supplied by a generator driven by the internal combustion engine when the state of charge is low. A type of a hybrid vehicle has been developed in which such an electric storage device can be charged by electricity supplied from the outside of the vehicle (for example, refer to Japanese Laid-Open Patent Publication No. 2007-62638). Such a hybrid vehicle reduces the load on the internal combustion engine required for driving the generator. Thus, the fuel consumption rate and the emission performance are further improved.

In such a hybrid vehicle, the load on the internal combustion engine is reduced when the state of charge of the battery charger is in a favorable range. Thus, the fuel in the fuel tank is likely to remain unused for a long period and thus become degraded. This degrades the startability and the combustion state of the internal combustion engine. Particularly, in a vehicle disclosed in Japanese Laid-Open Patent Publication No. 2007-62638, in which the electric storage device can be charged by electricity supplied from the outside of the vehicle, the state of charge of the electric storage device is maintained in a predetermined range due to a continuous charging. As a result, the internal combustion engine can remain unused for a long period. This promotes the degradation of the fuel in the fuel tank.

DISCLOSURE OF THE INVENTION

It is an objective of the present invention to provide a control apparatus of a hybrid vehicle that accurately perceives the degradation state of fuel in a fuel tank.

To achieve the foregoing objective and in accordance with one aspect of the present invention, a control apparatus of a hybrid vehicle that has as drive sources an internal combustion engine, to which fuel stored in a fuel tank is supplied, and an electric motor, to which electricity stored in an electric storage device is supplied, is provided. The apparatus includes a memory section and a degradation degree calculation section. The memory section stores history of the time of refueling and the amount of refueling at each of a plurality of refuelings to the fuel tank. Based on the history stored in the memory section, the degradation degree calculation section calculates the degree of degradation of the fuel in the fuel tank.

DETAILED DESCRIPTION OF THE PREFERRED EMBODIMENTS

A first embodiment of the present invention will now be described with reference to FIGS. 1 to 5.

Figure 1:
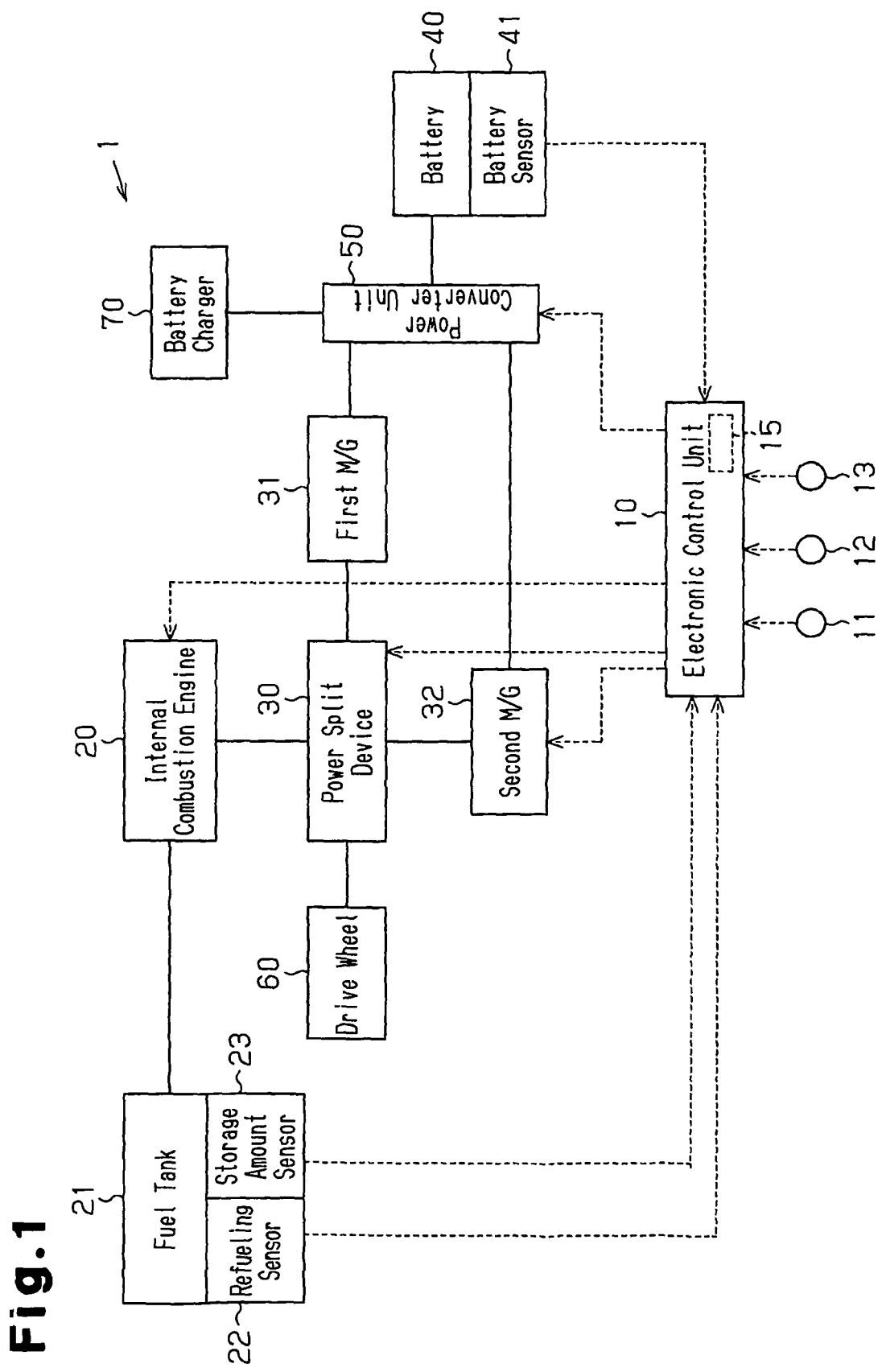
FIG. 1 is a block diagram illustrating the configuration of a hybrid vehicle according to a first embodiment of the present invention.

As shown in FIG. 1, a hybrid vehicle 1 has an internal combustion engine 20 and a second motor generator (second M/G) 32 as drive sources. The second M/G 32 corresponds to an electric motor.

The internal combustion engine 20 is a power unit such as a gasoline engine and a diesel engine, and generates drive force by burning gasoline fuel or diesel fuel (hereinafter referred to as fuel). Fuel that is supplied to the engine 20 is stored in a fuel tank 21. A refueling sensor 22 and a storage amount sensor 23 are attached to the fuel tank 21. The refueling sensor 22 outputs a signal when fuel is supplied to the fuel tank 21, and the storage amount sensor 23 detects the storage amount of the fuel in the fuel tank 21.

A first motor generator (first M/G) 31 is connected to the engine 20 through a power split device 30, and generates electricity by using the drive force of the engine 20. The generated electricity is sent to a power converter unit 50 and supplied to a battery 40 via the power converter unit 50 to be stored in the battery 40. At the starting of the internal combustion engine 20, the first M/G 31 starts the engine 20 by using electricity supplied from the battery 40, and functions as a starter.

The second M/G 32 is driven by electricity supplied from the battery 40, which serves as an electric storage device, and generates drive force. Also, the second W/G 32 generates electricity by using rotational force applied by drive wheels 60 when the vehicle is decelerating or being braked. The generated electricity is sent to a power converter unit 50 and supplied to a battery 40 via the power converter unit 50 to be stored in the battery 40.

The drive force of the internal combustion engine 20 and the second M/G 32 is transmitted to the drive wheels 60 from the power split device 30 via a reduction gear and a differential gear (neither is shown). Specifically, the power split device 30 includes a planetary gear mechanism having three rotary shafts, which are coupled to the internal combustion engine 20, the second M/G 32, and the first M/G 31, respectively. The power split device 30 splits the drive force of the internal combustion engine 20 to the first M/G 31 and the drive wheels 60, thereby driving the drive wheels 60 while causing the first M/G 31 to generate electricity. The power split device 30 transmits the drive force of the second M/G 32 to the drive wheels 60, thereby driving the drive wheels 60.

The battery 40 is connected to a battery charger 70 through the power converter unit 50. The battery charger 70 can be connected to an electric power supply located outside of the vehicle 1, and is capable of sending the electricity from the electric power supply to the power converter unit 50. Examples of the electric power supply outside the vehicle 1 include various types of electric power supply such as a commercial power supply. The battery charger 70 functions as a connection portion for charging the battery 40, which is an electric storage device, from outside of the vehicle.

The power converter unit 50, which includes components such as an inverter and a converter, converts alternating-current power supplied by the first M/G 31, the second M/G 32, and the battery charger 70 to direct-current power. The power converter unit 50 changes the voltage level of the direct-current power to a level appropriate for the battery 40, and then sends the direct-current power to the battery 40. Further, the power converter unit 50 converts direct-current power supplied by the battery 40 to alternating-current power and supplies it to the first M/G 31 and the second M/G 32.

The battery 40 is an electric storage device that can be charged and discharged, and includes, for example, a secondary battery such as a lithium-ion secondary battery and a nickel-metal-hydride secondary battery. The battery 40 supplies electricity to the power converter unit 50 and is charged with electricity supplied by the power converter unit 50. The electricity supplied from the power converter unit 50 to the battery 40 contains the electricity that is sent to the power converter unit 50 from the first M/G 31 and the second M/G 32, and the electricity sent from the outside of the vehicle 1 to the power converter unit 50 via the battery charger 70. A battery sensor 41 is attached to the battery 40. The battery sensor 41 detects a voltage VB of the battery 40 and a current IB sent to and from the battery 40.

Other than the above described sensors, the vehicle 1 has various types of sensors for perceiving the driving state of the vehicle 1. For example, the vehicle 1 has a vehicle speed sensor 11 for detecting the speed of the vehicle 1, an accelerator pedal position sensor 12 for detecting the amount of depression of the accelerator pedal (not shown) operated by the driver, and a shift position sensor 13 for detecting the position of the shift lever (not shown) manipulated by the driver. Output signals of these sensors are sent to an electronic control unit 10 provided in the vehicle 1. The electronic control unit 10 controls various devices mounted on the vehicle 1 collectively. Arrows of broken lines in FIG. 1 represent input and output paths of signals between the electronic control unit 10 and other components, or various sensors and on-vehicle devices.

In addition to a non-illustrated central processing unit (CPU), the electronic control unit 10 includes a memory that stores control programs, computation maps, and data obtained during the execution of control processes. The electronic control unit 10 executes various control processes by perceiving the state of the vehicle 1 based on signals from the various sensors provided in the vehicle 1.

For example, the electronic control unit 10 detects the state of charge (SOC) of the battery 40 based on a signal from the battery sensor 41, and controls charging and discharging of the battery 40 such that the SOC is maintained in a predetermine range. Specifically, when detecting that the SOC of the battery 40 is lower than an SOC lower limit SOCL (predetermined level), the electronic control unit 10 sets a high load demand on the engine 20, thereby increasing the drive force of the engine 20. While taking into consideration the driving state of the vehicle 1, the electronic control unit 10 drives the first M/G 31 to charge the battery 40. The electronic control unit 10 executing these processes functions as a charging state maintaining section. On the other hand, when the battery 40 is charged by the first M/G 31 or the battery charger 70, and the electronic control unit 10 detects that the SOC of the battery 40 has reached an SOC upper limit SOCH, the electronic control unit 10 stops charging.

Also, the electronic control unit 10 perceives the driving state of the vehicle based on signals, for example, from the vehicle speed sensor 11, the accelerator pedal position sensor 12, and the shift position sensor 13. The driving state thus perceived includes the level of drive force demanded by the driver. Based on the perceived driving state of the vehicle 1 and the SOC of the battery 40, the electronic control unit 10 determines the ratio of the drive force of the engine 20 and the drive force of the second M/G 32, and computes a first load demand on the engine 20. The electronic control unit 10 executes various types of control of the engine 20, the power split device 30, the second M/G 32, and the first M/G 31. For example, based on the computed first load demand, the electronic control unit 10 controls the operating state of the engine 20 including the intake air amount, the fuel injection amount, and ignition timing. The electronic control unit 10 functions as a load demand computing section that executes the computation of the first load demand on the engine 20.

Further, based on signals from the refueling sensor 22 and the storage amount sensor 23, the electronic control unit 10 concurrently executes a post-refueling process and a fuel degradation suppressing process. Hereafter, the post-refueling process and the fuel degradation suppressing process will be described with reference to FIGS. 2 to 5. In the following description, it is assumed that no fuel is stored in the fuel tank 21 at the start of the time chart of FIG. 5, and that the number of certain refueling from the start of the time chart is represented by x. In other words, the refueling is referred to as the xth refueling. The letter x at the end of each value indicates that the value is related to the xth refueling.

Figure 2:
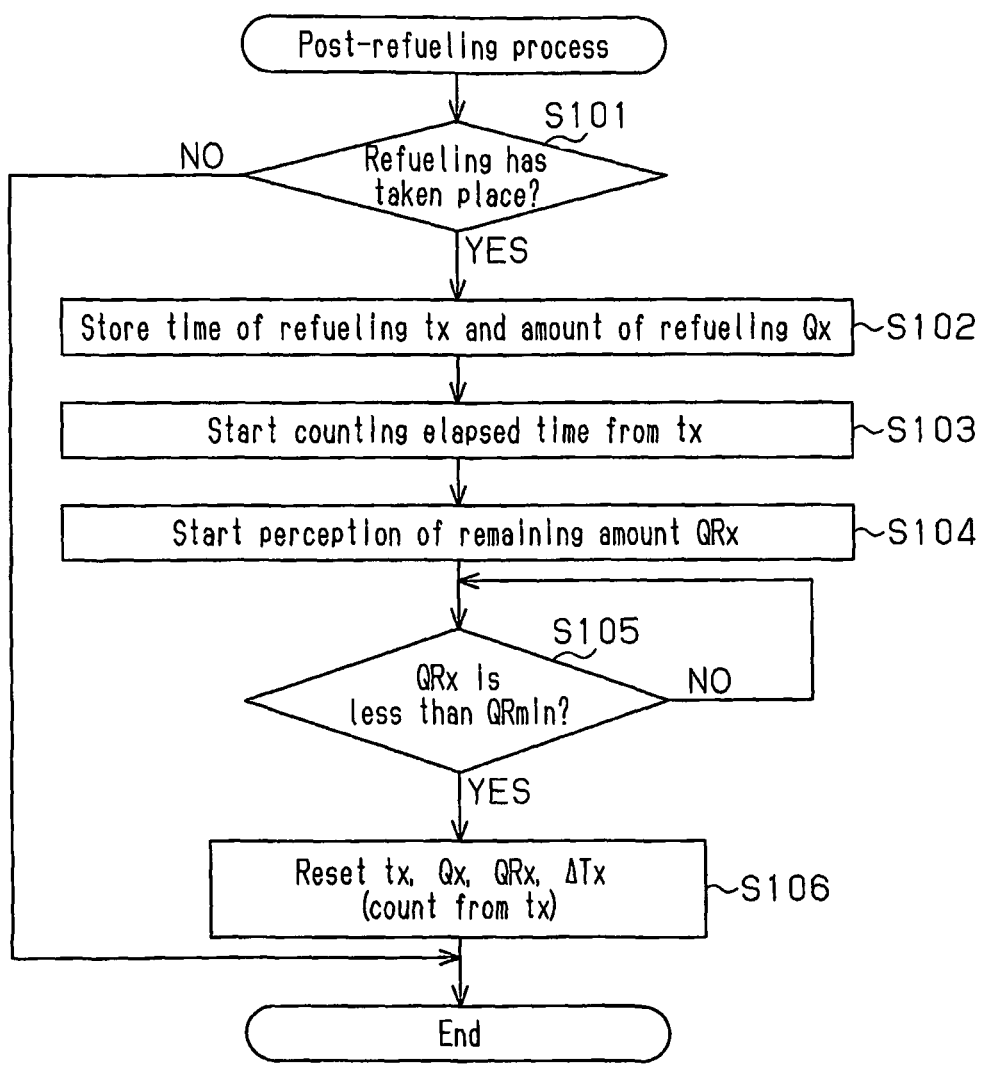
FIG. 2 is a flowchart showing a procedure of a post-refueling process of the hybrid vehicle shown in FIG. 1.

The post-refueling process shown in the flowchart of FIG. 2 is executed by the electronic control unit 10 every time fuel is fed to the fuel tank 21.

In this series of procedure, it is determined whether refueling has taken place based on a signal from the refueling sensor 22 (step S101). If it is determined that no refueling has taken place (step S101: NO), the current process is ended. If it is determined that refueling has taken place (step S101: YES), steps S102 to S106 are executed for the refueling. That is, the time of refueling tx and the amount of refueling Qx are stored (step S102). Specifically, the time of refueling tx is perceived based on a signal from the refueling sensor 22, and the amount of refueling Qx is computed from the stored amount before and after the refueling, which is detected based on a signal from the storage amount sensor 23. The obtained time of refueling tx and the amount of refueling Qx are stored in the memory 15. For example, in the first refueling shown in FIG. 5, its time of refueling t1, or point in time t11, and the amount of refueling Q1 at the time are stored in memory 15. The memory 15 corresponds to a memory section that stores refueling history. In this manner, by storing the time of refueling tx and the amount of refueling Qx at step S102 at every refueling, the history of the time of refueling tx and the amount of refueling Qx over several refuelings is stored.

Subsequently, the elapsed time from the time of refueling tx starts being counted (step S103). Then, the perception of the remaining amount QRx, that is, the remaining amount of the fuel that has been supplied at the xth refueling is started (step S104). For example, in the first refueling, time (elapsed time ΔT1) starts being counted from the time of refueling t1, and then the remaining amount QR1 starts being perceived.

It is determined whether the remaining amount QRx is less than a predetermined value QRmin (step S105). The predetermined value QRmin is set in advance to a value that indicates that the fuel supplied at the xth refueling has been substantially entirely consumed. If it is determined that the remaining amount QRx is more than or equal to the predetermined value QRmin, that is, if it is determined that the fuel still remains (step S105: NO), the determination at step S105 is executed again. That is, until it is determined that the remaining amount QRx is less than the predetermined value QRmin (step S105: YES), the determination of step S105 is repeated at predetermined time intervals. For example, in the first refueling, the determination of step S105 is repeated at predetermined time intervals until it is determined that the remaining amount QR1 is less than the predetermined value QRmin. The promotion of reduction in the remaining amount QRx is executed by setting the load demand on the engine 20 to a first load demand or a second load demand in a fuel degradation suppressing process, which will be discussed below.

If the remaining amount QRx is determined to be less than the predetermined value QRmin (step S105: YES) through the determination process, the time of refueling tx, the amount of refueling Qx, the remaining amount QRx, the count value from the time of refueling tx (elapsed time ΔTx) are all reset (step S106), and the series of procedure is ended. For example, in the first refueling, if the remaining amount R1 is less than the predetermined value QRmin at point in time t14, the time of refueling t1, the amount of refueling Q1, the remaining amount QR1, and the count value (elapsed time ΔT1) from the time of refueling t1 are all reset, so that the post-refueling process executed for the first refueling is ended.

If fuel remains for an extended period of time in the fuel tank 21 without being consumed, the degradation of the fuel is likely to degrade the startability of the internal combustion engine 20 and the combustion state in the engine 20. In this respect, the fuel degradation suppressing process shown in FIG. 3 is executed concurrently with the post-refueling process described above in the present embodiment, so that the fuel in the fuel tank 21 is prevented from being degraded.

Figure 3:
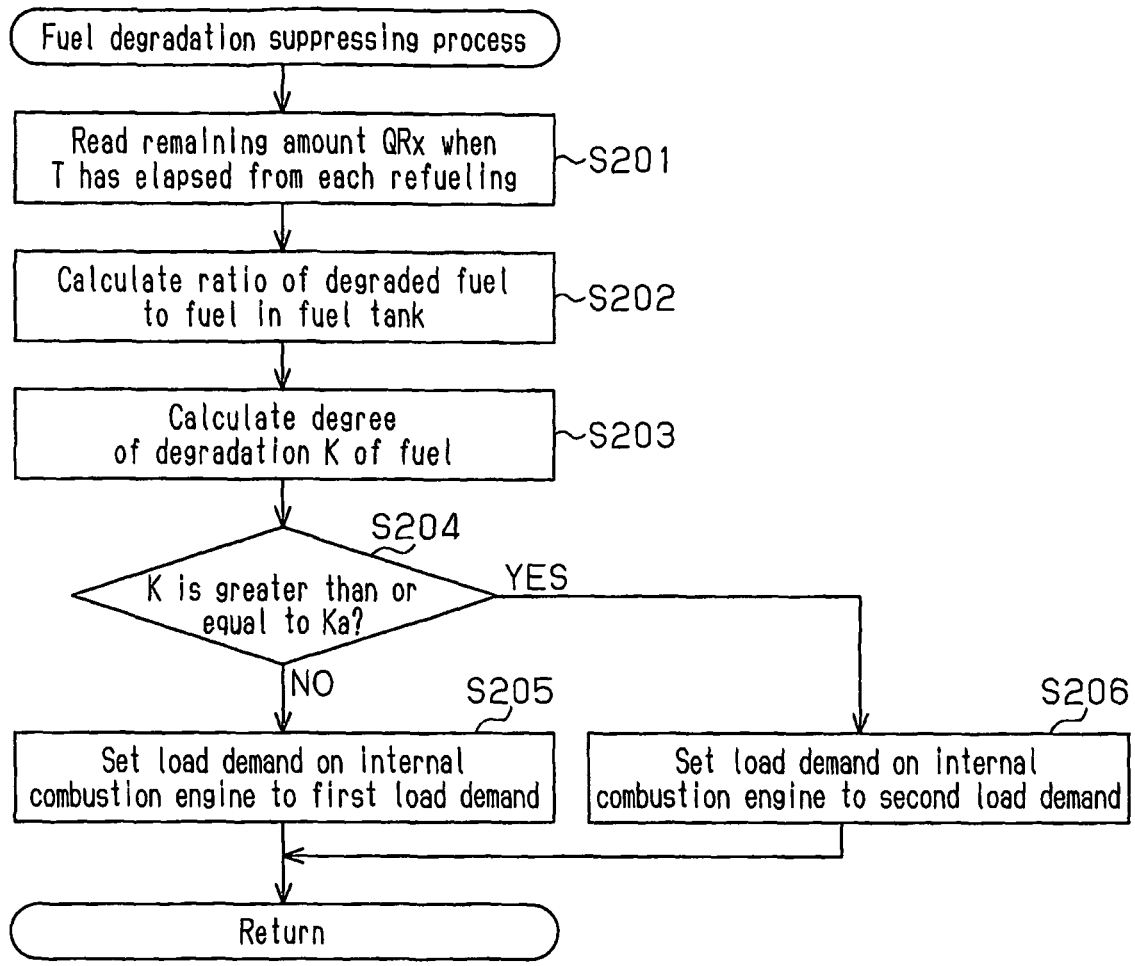
FIG. 3 is a flowchart showing a procedure of a fuel degradation suppressing process of the hybrid vehicle shown in FIG. 1.

The fuel degradation suppressing process shown in FIG. 3 is repeatedly executed by the electronic control unit 10 at predetermined time intervals immediately after the engine 20 is started. In this series of procedure, the remaining amount QRx when a predetermined period T has elapsed from each refueling is read in (step S201). Specifically, referring to the above described post-refueling process, which is executed at every refueling, refuelings in each of which the count value from the time of refueling tx (elapsed time ΔTx) has exceeded the predetermined period T are identified, and the remaining amounts QRx of such refuelings are read in. In the present process, the remaining amount QRx is perceived as zero for the refueling of which the elapsed time ΔTx has not exceeded the predetermined period T. Also, as described above, if it is not determined that the remaining amount QRx is less than the predetermined value QRmin before the predetermined period T elapses in step S105 (step S105: YES), the remaining amount QRx has been reset and is thus perceived as zero. The predetermined period T is set to a period in which supplied fuel is determined to have degraded to a certain degree, and is determined in advance through experiments. Hereinafter, fuel that remains unused for the predetermined period T will be referred to as degraded fuel.

Based on the perceived remaining amounts QRx, the ratio of degraded fuel to the fuel in the fuel tank 21 is calculated (step S202). Specifically, the sum of the remaining amounts QRx perceived in step S201 is obtained, and the ratio of the sum to the total amount of the fuel in the fuel tank 21 is calculated.

Figure 5:
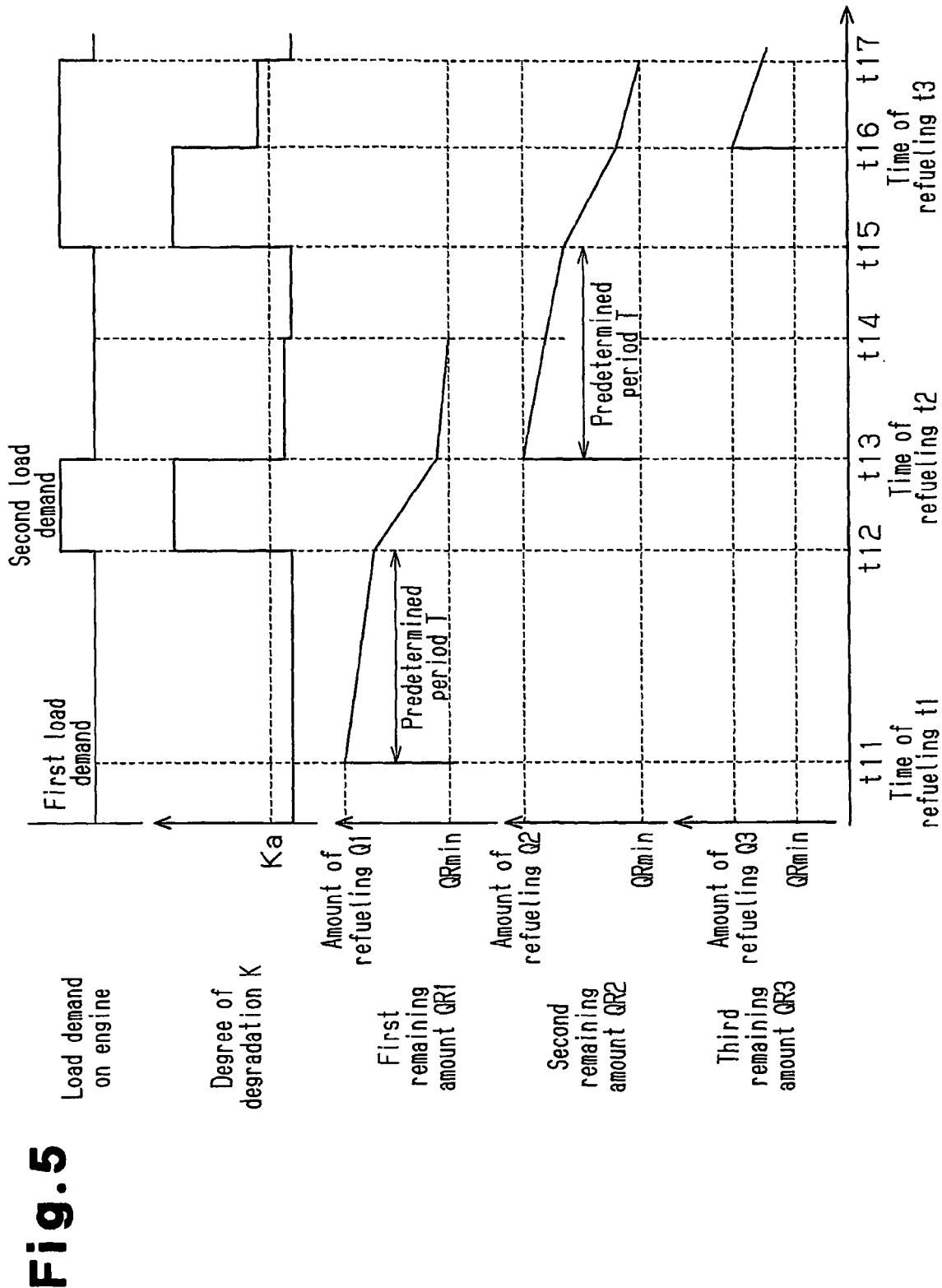
FIG. 5 is a time chart showing one example of the control of the hybrid vehicle shown in FIG. 1.

For example, in the period from point in time t11 to point in time t12 shown in FIG. 5, the elapsed time ΔTx of no refueling has exceeded the predetermined period T. The remaining amount QRx is thus perceived as zero at step S201. In this case, the ratio of degraded fuel to the fuel in the fuel tank 21 is calculated as 0%.

When the elapsed time ΔT1 of the first refueling exceeds the predetermined period T at point in time t12, the remaining amount QR1 of the first refueling continues being read in until point in time t14, that is, until the values related to the first refueling are reset in step S106. Until point in time t13, at which the second refueling takes place, the fuel stored in the fuel tank 21 is entirely the fuel supplied at the first refueling. Thus, at step S202, the ratio of degraded fuel to the fuel in the fuel tank 21 is calculated as 100% (1.0). At point in time t13, fuel the amount of which is an amount of refueling Q2 is added to the fuel tank 21 through the second refueling. During the period from point in time t13 to point in time t14, the ratio Y of degraded fuel to the fuel in the fuel tank 21 can be calculated by the following expression (1).

$$Y = QR1/(QR1+QR2) \qquad (1)$$

Further, when the elapsed time ΔT2 of the second refueling exceeds the predetermined period T at point in time t15, the remaining amount QR2 of the second refueling continues being read in until point in time t17, that is, until the values related to the second refueling are reset in step S106. Until point in time t16, at which the third refueling takes place, the fuel stored in the fuel tank 21 is entirely the fuel supplied at the second refueling. Thus, at step S202, the ratio of degraded fuel to the fuel in the fuel tank 21 is calculated as 100% (1.0). At point in time t16, fuel the amount of which is an amount of refueling Q3 is added to the fuel tank 21 through the third refueling. After point in time t16, the ratio Y of degraded fuel to the fuel in the fuel tank 21 can be calculated by the following expression (2).

$$Y = QR2/(QR2+QR3) \qquad (2)$$

Figure 4:
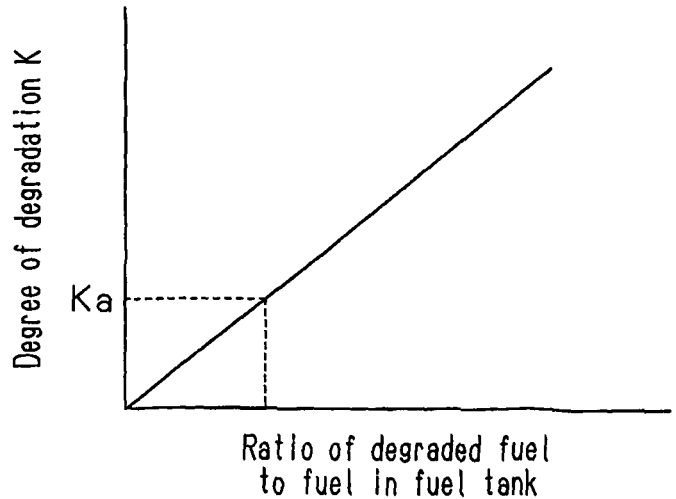
FIG. 4 is a graph related to the fuel degradation suppressing process of FIG. 3, showing the relationship between the degree of degradation and the ratio of the fuel that has remained unused for a predetermined period to the fuel in the fuel tank.

After the ratio of degraded fuel to the fuel in the fuel tank 21 is calculated in step S202, the degree of degradation of fuel K is calculated based on the calculated ratio (step S203). The degree of degradation K indicates the degree of degradation of the entirety of the fuel in the fuel tank 21, that is, the state of degradation of the fuel in the fuel tank 21. Specifically, as shown in FIG. 4, the higher the calculated ratio, the higher the degree of degradation K of the fuel in the fuel tank 21 is calculated to be. The relationship between the degree of degradation K and the ratio of degraded fuel to the fuel in the fuel tank shown in FIG. 4 is determined in advance through experiments and stored in the memory 15. The process of steps S201 through S203 corresponds to the process executed by a degradation degree calculation section.

It is determined whether the calculated degree of degradation K is greater than or equal to a predetermined Ka (step S204). The predetermined value Ka is set to the minimum value in a range of the degree of degradation K, in which range it is determined that consumption of the fuel in the fuel tank 21 is preferably promoted in order to suppress degradation of the fuel in the fuel tank 21. To improve the fuel consumption rate and the emission performance, the fuel consumption is preferably reduced as much as possible. On the other hand, degradation of the fuel in the fuel tank 21 is likely to degrade the startability of the internal combustion engine 20 and the combustion state in the engine 20. Taking these into consideration, the predetermined value Ka is set to an appropriate value.

If it is determined that the degree of degradation K is less than the predetermined value Ka (step S204: NO), the degree of degradation of the fuel in the fuel tank 21 is determined to be low. Thus, the load demand on the internal combustion engine 20 is set to the first load demand (step S205). The series of procedure is then ended. The first load demand on the internal combustion engine 20 is a basic value of the load demand on the engine 20, and is calculated as described above based on the driving state of the vehicle 1 perceived based on signals from various sensors mounted on the vehicle 1 and on the SOC of the battery 40 detected based on a signal from the battery sensor 41.

For example, during the period from point in time t11 to point in time t12 shown in FIG. 5, some of the fuel supplied at the first refueling has yet to remain unused for the predetermined period T, and the degree of degradation K is less than the predetermined value Ka. The load demand on the engine is set to the first load demand. When the second refueling takes place at point in time t13, the fuel supplied at the second refueling lowers the ratio of the fuel (fuel supplied at the first refueling) that has remained unused for the predetermined period T (step S202). Since this causes the calculated degree of degradation K to be less than the predetermined value Ka (step S204: NO), the load demand on the engine is set to the first load demand.

If it is determined that the degree of degradation K is higher than or equal to the predetermined value Ka (step S204:YES), the degree of degradation of the fuel in the fuel tank 21 is determined to be high. Thus, the load demand on the internal combustion engine 20 is set to the second load demand (step S206). The process of this step corresponds to the process executed by a load demand changing section. Specifically, when the degree of degradation K surpasses the predetermined value Ka at point in time t12 of FIG. 5 due to the fact that some of the fuel supplied at the first refueling has remained unused over the predetermined period T, the load demand on the engine is set to the second load demand, which is higher than the first load demand. Also, when the degree of degradation K surpasses the predetermined value Ka at point in time t15 due to the fact that some of the fuel supplied at the second refueling has remained unused over the predetermined period T, the load demand on the engine is set to the second load demand. In this manner, the consumption of the fuel in the fuel tank 21 is promoted by changing the load demand on the engine to the second load demand, which is higher than the first load demand. The series of step is thus complete.

When fuel of an amount of refueling Q3 of fuel is supplied to the fuel tank 21 at third refueling at point in time t16 of FIG. 5, if the amount of refueling Q3 is relatively small and the degree of degradation K does not fall below the predetermined value Ka (step 204: YES), it is determined that the degradation state of the fuel in the fuel tank 21 has not been reduced. In such a case, the load demand on the engine is continuously set to the second load demand at step S206, so that the consumption of the fuel in the fuel tank 21 is promoted. When it is determined that the degree of degradation K is less than the predetermined value Ka at step S204 after repetitive executions of the fuel degradation suppressing process (step S204: NO), the load demand on the internal combustion engine is set to the first load demand (step S205). The cases where it is determined that the degree of degradation K is less than the predetermined value Ka at step S204 (step S204: NO) include a case where new refueling takes place and a case where the remaining amount QRx of the fuel that remains unused over the predetermined period T falls below the predetermined value QRmin. That is, fuel stored in the fuel tank 21 is the mixture of fuel of several refuelings. When the mixture ratio is changed by new refueling and consumption of fuel and the ratio of degraded fuel (fuel that has remained unused over the predetermined period T) to the fuel in the fuel tank 21 is lowered, the degradation state of the fuel in the fuel tank 21 is reduced.

The above described first embodiment has the following advantages.

(1) Normally, refueling to the fuel tank 21 takes place with some fuel remaining in the fuel tank 21, and the amount of newly added fuel varies at random. Therefore, fuel stored in the fuel tank 21 is the mixture of fuel several refuelings. That is, the greater the remaining amount of old fuel, and the smaller the amount of supplied fuel, the higher the degree of degradation K of the fuel in the fuel tank 21 after the refueling becomes. On the other hand, the smaller the remaining amount of old fuel, and the greater the amount of supplied fuel, the lower the degree of degradation K of the fuel in the fuel tank 21 after the refueling becomes. According to the present embodiment, the history of the time of refueling tx and the amount of refueling Qx of each of several refuelings to the fuel tank 21 are stored (step S102), and the degree of degradation K is calculated based on the stored history (step S203). This allows the degradation state of the fuel in the fuel tank 21 to be accurately perceived.

(2) The ratio of degraded fuel (the fuel that has remained unused for the predetermined period T from the time of refueling tx) to the fuel in the fuel tank 21 is calculated based on the history stored in the memory 15 (step S202). The higher the calculated ratio, the higher the degree of degradation K is calculated to be (step S203). This allows the degradation state of the fuel in the fuel tank 21 to be accurately perceived.

(3) The first load demand on the engine 20 is calculated based on the driving state of the vehicle 1 and the state of charge (SOC) of the battery 40. Since the load demand on the internal combustion engine 20 is changed to the second load demand, which is higher than the first load demand, when the degree of degradation K is higher than or equal to the predetermined value Ka (step S206), the consumption of fuel of which the degree of degradation K is high is promoted. This suppresses degradation of the startability and the combustion state of the internal combustion engine.

(4) Since the load demand on the engine 20 is determined after accurately perceiving the state of degradation of the fuel in the fuel tank 21, wasteful consumption of fuel is suppressed. Specifically, even in a case where fuel that has remained unused in the fuel tank 21 over the predetermined period T at point in time t13 (some of the fuel supplied at the first refueling), if the fuel supplied at the second refueling dilutes the fuel supplied at the first refueling, so that the degree of degradation K falls below the predetermined value Ka (step S204: NO), the load demand on the engine 20 is set to the first load demand (step S205). Therefore, the load on the engine 20 is not unnecessarily increased, and the fuel consumption is suppressed.

(5) Since the load demand on the engine 20 is determined after accurately perceived the state of degradation of the fuel in the fuel tank 21, the load demand on the engine 20 is properly increased. Specifically, in the case where the third refueling takes place at point in time t16, if the amount of refueling Q3 is small and the degree of degradation K does not fall below the predetermined value Ka, that is, when the degree of degradation K remains higher than or equal to the predetermined value Ka (step S204: YES), the degree of degradation K is determined to be high, and the load demand on the engine 20 is maintained at the second load demand (step s206). Thus, the fuel in the fuel tank 21 is reliably prevented from being degraded.

(6) In the vehicle 1, which has the battery charger 70, the load on the internal combustion engine 20 due to the reduction in the SOC of the battery 40 is reduced. Thus, if the engine 20 is not operated for an extended period of time, the fuel in the fuel tank 21 is likely to be further degraded. However, according to the present embodiment, the state of degradation of the fuel in the fuel tank 21 is accurately perceived. Also, degradation of fuel is suppressed by the fuel degradation suppressing process. That is, the fuel consumption rate and the emission performance brought about by the battery charger 70 can be improved while suppressing the degradation of the fuel in the fuel tank 21.

A second embodiment of the present invention will now be described with reference to FIGS. 1 and 6 to 10. Those processes that are like or the same as the corresponding processes of the first embodiment will not be described.

The present embodiment is different from the first embodiment in the following points. That is, in the first embodiment, the remaining amount QRx of fuel that has remained unused over the predetermined period T from each refueling is read in (step S201), and the degree of degradation K is calculated based on the remaining amount QRx (step S203). In other words, when calculating the degree of degradation K, only the fact that the elapsed time ΔTx surpasses the predetermined period T is taken into account. In contrast, according to the present embodiment, the degree of degradation K is calculated such that the greater the count value (elapsed time ΔTx) from the time of refueling tx, the higher the degree of degradation kx of fuel supplied at the xth refueling becomes, and that the greater the remaining amount QRx of the fuel of which the degree of degradation kx is high, the higher the degree of degradation of the fuel in the fuel tank 21 becomes. That is, in the case where the remaining amount QRx is the same, the longer the elapsed time ΔTx of the supplied fuel, the higher the degree of degradation K is calculated to be. Also, in the case where the elapsed time ΔTx is the same, the greater the remaining amount QRx, the higher the degree of degradation K is calculated to be.

In the first embodiment, the load demand on the engine is set to the second load demand to increase the load on the engine 20, thereby promoting the fuel consumption. In contrast, according to the present embodiment, the lower limit SOCL of the state of charge SOC of the battery 40 is raised, so that the load on the engine 20 is set to a high value more frequently.

Figure 6:
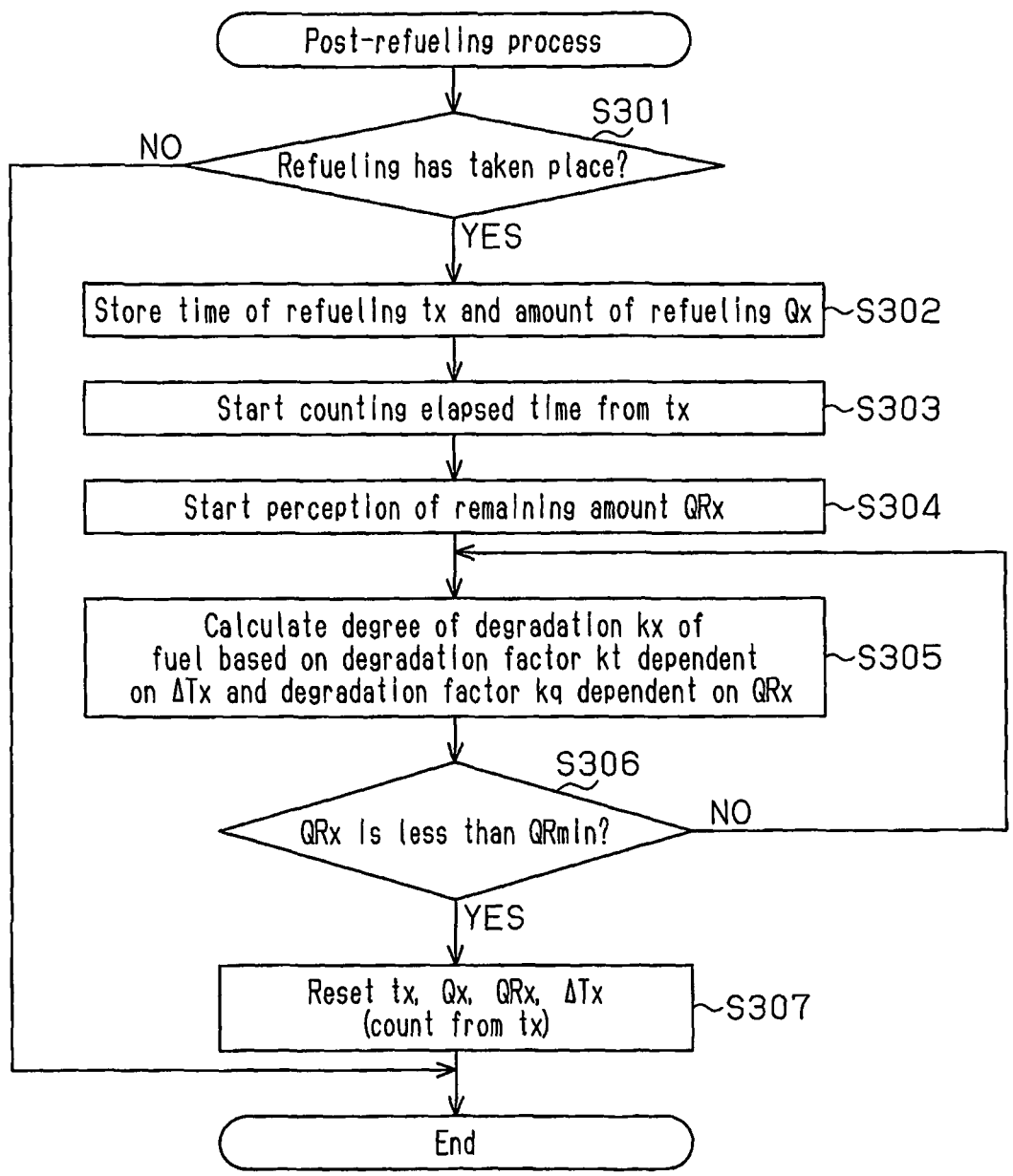
FIG. 6 is a flowchart showing a procedure of a post-refueling process according to a second embodiment of the present invention.

The post-refueling process according to the present embodiment will be described with reference to FIG. 6. The post-refueling process shown in the flowchart of FIG. 6 is executed by the electronic control unit 10 every time fuel is fed to the fuel tank 21.

In this series of procedure, it is determined whether refueling has taken place (step S301). If it is determined that no refueling has taken place (step S301: NO), the current process is ended. If it is determined that refueling has taken place (step S301: YES), steps S302 to S307 are executed for the refueling. That is, the time of refueling tx and the refueling amount Qx is stored (step S302). Then, the count value of the elapsed time from the time of refueling tx starts being counted (step S303). Subsequently, the perception of the remaining amount QRx is started (step S304).

Figure 8:
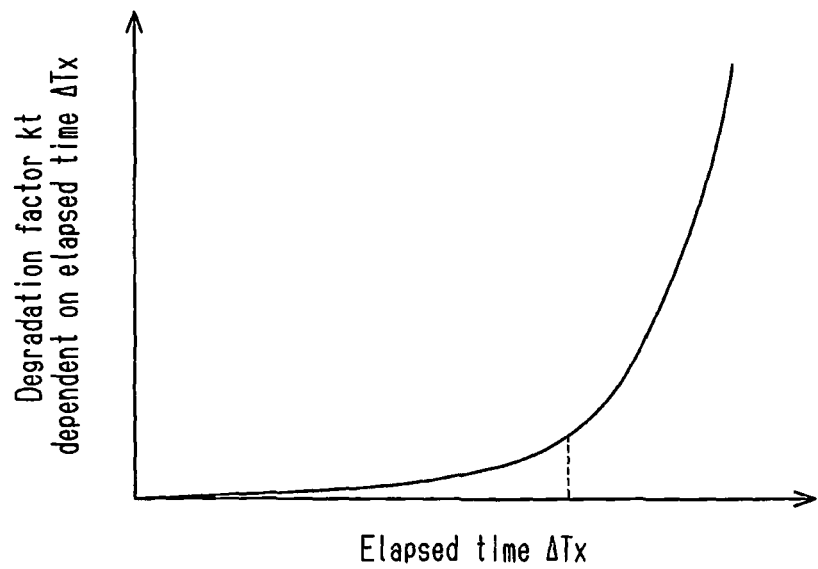
FIG. 8 is a graph related to the post-refueling process of FIG. 6, showing the relationship between elapsed time from the time of refueling and a degradation factor, which is dependent on the elapsed time.
Figure 9:
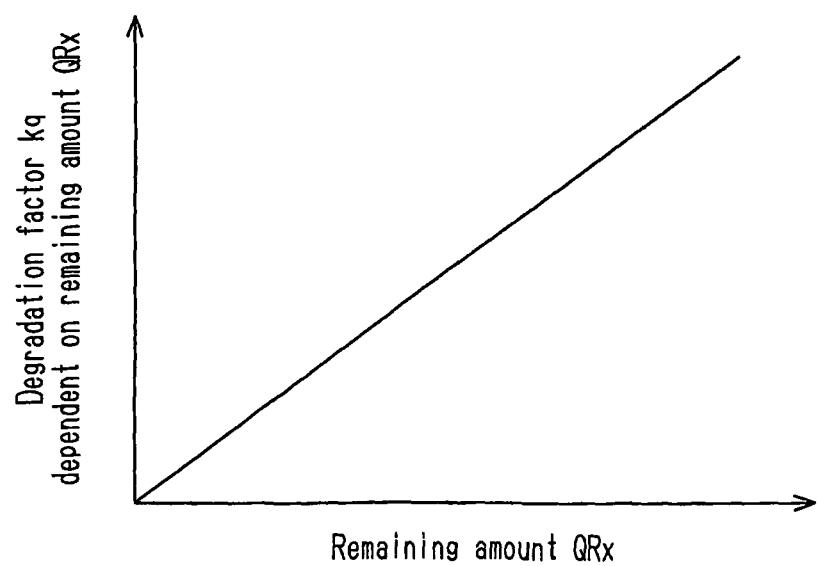
FIG. 9 is a graph related to the post-refueling process of FIG. 6, showing the relationship between an remaining amount of fuel and the degradation factor, which is dependent on the remaining amount.

Next, based on a degradation factor kt that is dependent on the elapsed time ΔTx and a degradation factor kq that is dependent on the remaining amount QRx, the degree of degradation kx of fuel is calculated (step S305). Specifically, as shown in FIG. 8, the longer the elapsed time ΔTx, the greater the degradation factor kt becomes. Also, as shown in FIG. 9, the greater the remaining amount QRx, the greater the degradation factor kq becomes. The multiplication of the degradation factors kt, kq is performed to calculate a degradation factor kx related to the xth refueling. The degradation factor kt and the degradation factor kq are set in advance, for example, through experiments. Specifically, the rate of increase of the degradation factor kt is increased as the elapsed time ΔTx becomes longer. More specifically, the rate of increase of the degradation factor kt is set to be abruptly increased at about the time when the elapsed time ΔTx passes the predetermined period T. The predetermined period T is a period after which it can be determined that supplied fuel is highly likely to be degraded.

It is determined whether the remaining amount QRx is less than a predetermined value QRmin (step S306). If it is determined that the remaining amount QRx is not less than the predetermined value QRmin, that is, if it is determined that the remaining amount QRx is greater than or equal to the predetermined value Rmin (step S306: NO), step S305 is executed again, so that the degree of degradation kx of fuel is calculated.

In this manner, until it is determined that the remaining amount QRx is less than the predetermined value QRmin at step S306 (step S306: YES), step S305 is repeated at predetermined time intervals, so that the degree of degradation kx of fuel is calculated. The degree of degradation kx thus calculated is changed as the elapsed time ΔTx and the remaining amount QRx change. For example, even in the case where the remaining amount QRx remains unchanged, the degree of degradation kx increases as the elapsed time ΔTx increases. The promotion of reduction in the remaining amount QRx is executed by setting the SOC determination value of the battery 40 to a first determination value or a second determination value in a fuel degradation suppressing process, which will be discussed below.

If the remaining amount QRx is determined to be less than the predetermined value QRmin (step S306: YES) through the process, the time of refueling tx, the amount of refueling Qx, the remaining amount QRx, the count value from the time of refueling tx (elapsed time ΔTx) are all reset (step S307), and the series of procedure is ended.

Figure 7:
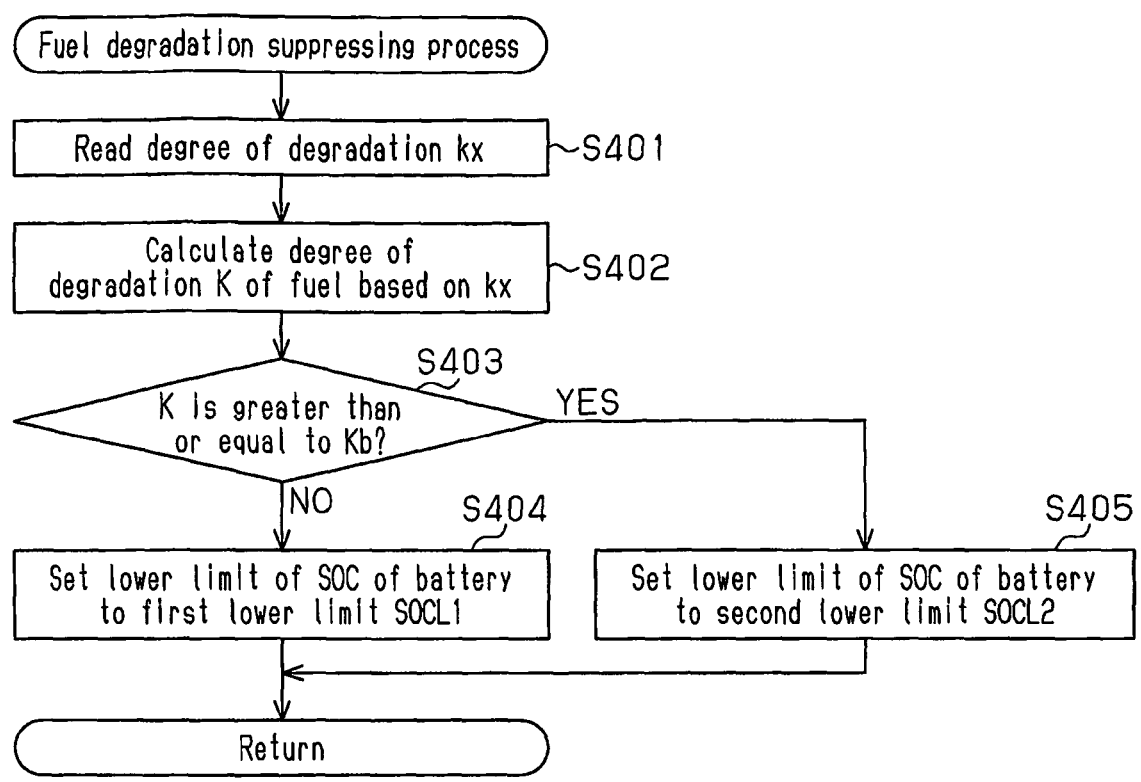
FIG. 7 is a flowchart showing a procedure of a fuel degradation suppressing process according to the second embodiment of the present invention.

Referring to FIG. 7, the fuel degradation suppressing process, which is concurrently executed with the post-refueling process, will be described.

The process shown in the flowchart of FIG. 7 is repeatedly executed by the electronic control unit 10 at predetermined time intervals immediately after the engine 20 is started.

In this series of procedure, the degree of degradation kx at each refueling is first read in (step S401). Specifically, referring to the above described post-refueling process, which is executed at every refueling, the degree of degradation kx of fuel, which is calculated above described step S305, is read in.

Based on the read in degree of degradation kx, the degree of degradation K is calculated (step S402). The degree of degradation K is calculated by accumulating the degree of degradation kx, while taking into account the ratio of fuel at each refueling to the fuel in the fuel tank 21. Specifically, the product of the ratio of the fuel supplied at each xth refueling to the fuel in the fuel tank 21 and the degree of degradation kx of the fuel supplied at the xth refueling is obtained, and the sum of the products of several refuelings is calculated as the degree of degradation K. The process of steps S305, S401, and S402 corresponds to the process executed by a degradation degree calculation section.

It is determined whether the calculated degree of degradation K is greater than or equal to a predetermined Kb (step S403). The predetermined value Kb is set to the minimum value in a range of the degree of degradation K, in which range it is determined that consumption of the fuel in the fuel tank 21 is preferably promoted in order to suppress degradation of the fuel in the fuel tank 21.

If it is determined that the degree of degradation K is less than the predetermined value Kb (step S403: NO), the degree of degradation of the fuel in the fuel tank 21 is determined to be low. Thus, the lower limit of the SOC of the battery is set to the first lower limit SOCL1 (step S404). The series of procedure is then ended.

Figure 10:
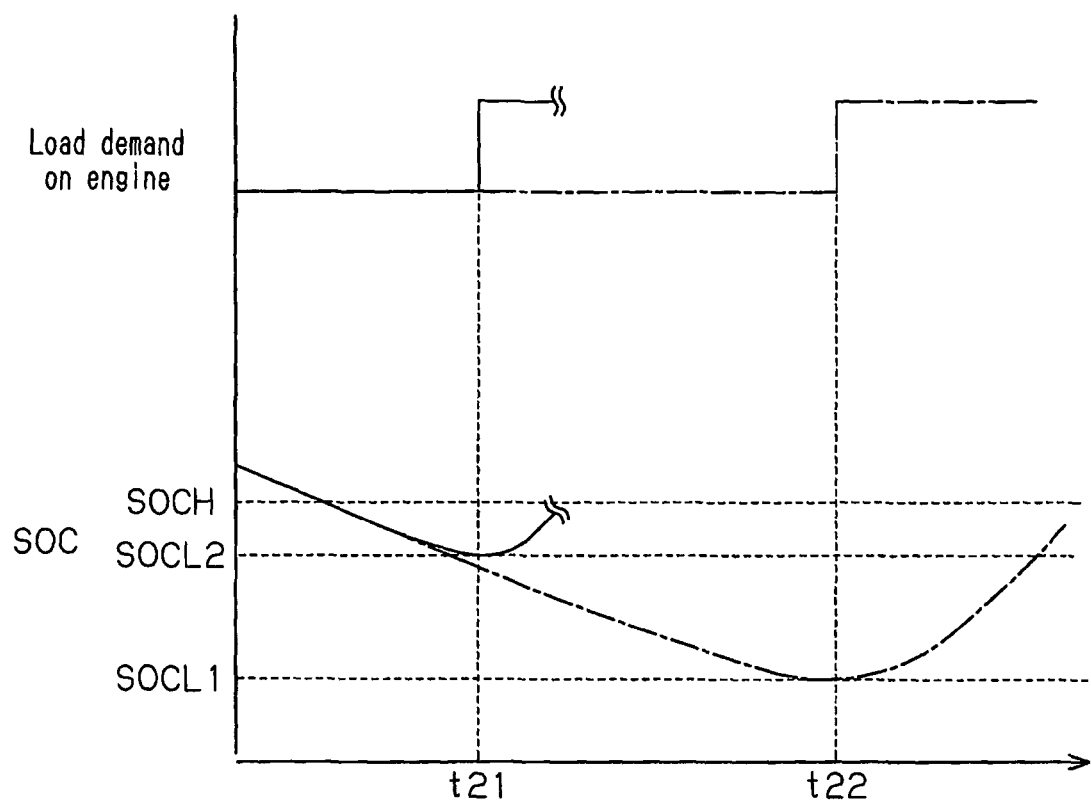
FIG. 10 is a time chart related to the fuel degradation suppressing process of FIG. 7, showing changes in a lower limit of the state of charge of the battery and the load demand on the engine.

If it is determined that the degree of degradation K is higher than or equal to the predetermined value Kb (step S403: YES), the degree of degradation of the fuel in the fuel tank 21 is determined to be high. Thus, the lower limit of the SOC of the battery is set to the second lower limit SOCL2 (step S405). The second lower limit SOCL2 is higher than the first lower limit SOCL1, which is the initial value of the SOC lower limit SOCL. Increase in the load demand on the engine 20, which accompanies reduction in the SOC of the battery 40, can be carried out at an early stage. Specifically, as shown in FIG. 10, when the SOC lower limit SOCL of the battery 40 is set to the second lower limit SOCL2, the load demand on the engine 20 is increased at point in time t21 (solid line). In contrast, when the SOC lower limit SOCL of the battery 40 is set to the first lower limit SOCL1, the load demand on the engine 20 is increased at point in time t22 (alternate long and short dash line). The lower the SOC lower limit SOCL of the battery 40 is set to, the more likely that the battery 40 will be charged by the battery charger 70 before the SOC of the battery 40 falls to the SOC lower limit SOCL. Thus, it is more likely that point in time t22 will be delayed. The load demand on the engine 20 is increased at an early stage by setting the SOC lower limit SOCL to the second lower limit SOCL2 at step S405. This allows the load on the engine 20 to be set to a high level more frequently, so that the fuel consumption is promoted. The process of this step corresponds to the process executed by a charging condition changing section. The series of step is thus complete.

In addition to the advantages of the above items (1) and (4) to (6), the second embodiment provides the following advantages.

(7) According to the present embodiment, based on the history stored in the memory 15, the longer the elapsed time ΔTx from the time of refueling tx and the greater the remaining amount QRx, the higher the degree of degradation kx is calculated to be (step S305) in each of several refuelings. Also, the degree of degradation K is calculated by accumulating the values of the degree of degradation kx (step S402). Therefore, the state of degradation of the fuel in the fuel tank is accurately perceived.

(8) In the vehicle 1, in which control is executed for setting the load demand on the engine 20 to a high value when the SOC of the battery 40 is lower than a predetermined level, that is, lower than the lower limit SOCL of the SOC, the lower limit SOCL of the SOC is raised to the second lower limit SOCL2 on the condition that the calculated degree of degradation K is higher than or equal to the predetermined value Kb (step S405). Thus, increase in the load demand on the engine 20, which accompanies reduction in the SOC of the battery 40, can be carried out at an early stage. Accordingly, the consumption of the fuel in the fuel tank 21 is promoted.

The present invention may be modified as follows.

In the first embodiment, the load demand is set to the second load demand, which is higher than the first load demand when the degree of degradation K is determined to be higher than or equal to the predetermined value Ka (step S206). However, it may be configured that, when the vehicle 1 is traveling using only the second M/G 32 as the drive source, the internal combustion engine 20 starts being operated so that the vehicle 1 is driven by the drive force of the engine 20, thereby promoting the consumption of the fuel in the fuel tank 21. Further, as in the second embodiment, the lower limit SOCL of the battery 40 may be set to the second lower limit SOCL2, so that the load demand on the engine 20 more frequently is set to a high value.

In the second embodiment, when the degree of degradation K is determined to be higher than or equal to predetermined value Kb, the SOC lower limit SOCL of the battery 40 is set to the second lower limit SOCL2, which is higher than the SOC lower limit SOCL1 (step S405), so that the load demand on the engine 20 is set more frequently to a high value. However, as in the first embodiment, the load demand on the engine 20 may be set to a second load demand that is higher than a first load demand. Also, it may be configured that, when the vehicle 1 is traveling using only the second M/G 32 as the drive source, the internal combustion engine 20 starts being operated so that the vehicle 1 is driven by the drive force of the engine 20, thereby promoting the consumption of the fuel in the fuel tank 21.

Methods for increasing the load demand on the engine 20 are not limited to those presented in the above embodiments. That is, any method may be employed as long as it promotes consumption of the fuel in the fuel tank 21. For example, a method may be employed in which the higher the degree of degradation K, the higher the second load demand or the higher the second lower limit SOCL2. Also, when the degree of degradation K is high and the SOC of the battery 40 is below a predetermined level, the second M/G 32 may be stopped so that the vehicle 1 is driven solely by the internal combustion engine 20.

In the illustrated embodiments, when the remaining amount QRx of fuel is determined to be less than the predetermined value QRmin at the xth refueling, the values related to the xth refueling are reset (step S106, step S307). However, the number of refuelings performed after the xth refueling may be counted, and when the counted number reaches a predetermined number, the values related to the xth refueling may be reset. This is because when a predetermined number of refuelings are performed after the xth refueling, the ratio of the fuel supplied at the xth refueling to the fuel in the fuel tank 21 is sufficiently low, and thus, the ratio of the fuel supplied at the xth refueling does not need to be taken into consideration when calculating the degree of degradation of the fuel in the tank 21.

In the first embodiment, when the degree of degradation K is determined to be less than the predetermined value Ka, the load demand on the internal combustion engine 20 is set to the first load demand (step S205). In the second embodiment, when the degree of degradation K is determined to be less than the predetermined value Kb, the SOC lower limit of the battery 40 is set to the first lower limit SOCL1 (step S404). That is, after the load demand on the engine 20 is increased, it is lowered on the condition that the degree of degradation K has been sufficiently lowered. However, as long as the fuel in the fuel tank 21 is reliably prevented from being degraded, other methods may be employed. For example, it may be configured that, after the load demand is set to a high value, the amount of all the fuel in the fuel tank 21 is consumed to a predetermined value, and a warning lamp is turned on to urge the driver to refuel. This configuration provides advantages equivalent to those presented above.

In each of the illustrated embodiments, the battery charger 70 to be connected to an electric power supply outside the vehicle 1 is provided. However, the present invention may be applied to a hybrid vehicle having no battery charger 70. That is, in a hybrid vehicle having an internal combustion engine to which the fuel stored in a fuel tank is supplied, and an electric motor to which electricity stored in an electric storage device is supplied, the load demand on the internal combustion engine may be set to a high value so that the consumption of the fuel is promoted when the degree of degradation of the fuel in the fuel tank is determined to be high, as in each of the illustrated embodiments. Even in this case, the above described advantages except for that of the item (6) are achieved.

The invention claimed is:

1. A control apparatus of a hybrid vehicle that has as drive sources an internal combustion engine, to which fuel stored in a fuel tank is supplied, and an electric motor, to which electricity stored in an electric storage device is supplied, the apparatus comprising:
   an electronic control unit including a degradation degree calculation section that calculates a degree of degradation of each of a plurality of refuelings, each degree of degradation being increased relative to an elapsed time since the respective refueling, the degradation degree calculation section also calculates a total degree of degradation of the fuel in the fuel tank based on the degree of degradation of each of the plurality of refueling and on a ratio of a remaining amount of each refueling to an amount of total fuel in the fuel tank.

2. The control apparatus according to claim 1, wherein the degradation degree calculation section calculates the degree of degradation for each of the plurality of refuelings such that the longer an elapsed time from a time of refueling and the greater the remaining amount, the higher the degree of degradation becomes, and
   wherein the degradation degree calculation section accumulates values of the degree of degradation of each of the plurality of refuelings, thereby calculating the total degree of degradation of the fuel in the fuel tank.

3. The control apparatus according claim 1, further comprising:
   a load demand computing section of the electronic control unit that calculates a first load demand on the engine based on a driving state of the vehicle and a state of charge of the electric storage device; and
   a load demand changing section of the electronic control unit that changes the load demand on the engine to a second load demand, which is higher than the first load demand, on a condition that the total degree of degradation calculated by the degradation degree calculation section is higher than or equal to a predetermined value.

4. The control apparatus according to claim 1, further comprising:
   a charging state maintaining section of the electronic control unit that sets a load demand on the engine to a high value when a state of charge of the electric storage device is lower than a predetermined level; and
   a charging condition changing section of the electronic control unit that raises the predetermined level on a condition that the total degree of degradation calculated by the degradation degree calculation section is higher than or equal to a predetermined value.

5. The control apparatus according to claim 1, further comprising:
   a connection portion that charges the electric storage device from outside of the vehicle.

6. The control apparatus according to claim 1, wherein the electronic control unit calculates the total degree of degradation of the fuel in the fuel tank as a sum of products of the degree of degradation of each of the plurality of refueling and the ratio of the remaining amount of each refueling to an amount of total fuel in the fuel tank.

* * * * *